United States Patent [19]

Weimer

[11] 4,055,509

[45] Oct. 25, 1977

[54] METHOD FOR INCREASING THE WATER DISPERSIBILITY OF ALPHA ALUMINA MONOHYDRATE

[75] Inventor: Dean R. Weimer, Ponca City, Okla.

[73] Assignee: Continental Oil Company, Ponca City, Okla.

[21] Appl. No.: 693,562

[22] Filed: June 7, 1976

Related U.S. Application Data

[63] Continuation-in-part of Ser. No. 291,501, Sept. 22, 1972, abandoned, which is a continuation-in-part of Ser. No. 140,945, May 6, 1971, abandoned.

[51] Int. Cl.$^2$ .............................................. B01F 3/18
[52] U.S. Cl. .......................... 252/363.5; 106/308 B; 252/313 R; 252/317; 252/463; 252/385; 106/308 B
[58] Field of Search ...................................... 252/363.5

[56] References Cited

U.S. PATENT DOCUMENTS

| 2,016,892 | 10/1935 | Clarvoe | 51/307 |
| 2,260,871 | 10/1941 | Sawyer | 106/308 B X |
| 3,357,791 | 12/1967 | Napier | 423/630 |
| 3,408,160 | 10/1968 | Schmidt et al. | 252/363.5 X |

*Primary Examiner*—Richard D. Lovering
*Attorney, Agent, or Firm*—Cortlan R. Schupbach, Jr.

[57] ABSTRACT

A method for improving the water-dispersibility of alpha alumina monohydrate containing up to about 86 weight percent $Al_2O_3$ wherein the method comprises mixing with the alpha alumina monohydrate from about 0.1 to about 50 weight percent based on the weight of the alumina of a salt compound selected from the group consisting of salts having the general formula MX wherein M is a polyvalent metal cation constituent for which the solubility product, $K_{SP}$, of the corresponding metal hydroxide is less than $10^{-20}$, and X is an anion constituent derived from a monovalent acid having an ionization constant, $K_A$, greater than $10^{+1}$ and phosphorus dichloride, phosphorus trichloride, phosphorus pentachloride, phosphorus tribromide, phosphorus pentabromide and antimony pentachloride.

9 Claims, No Drawings

METHOD FOR INCREASING THE WATER DISPERSIBILITY OF ALPHA ALUMINA MONOHYDRATE

BACKGROUND OF THE INVENTION

This application is a continuation-in-part of my earlier filed application, U.S. Ser. No. 291,501, entitled "Water Dispersible Alumina," filed Sept. 22, 1972, now abandoned, which is in turn a continuation-in-part of my earlier filed application U.S. Ser. No. 140,945 of the same title filed May 6, 1971, now abandoned.

FIELD OF THE INVENTION

The present invention relates to a method for increasing the water-dispersibility of alpha alumina monohydrate.

BRIEF DESCRIPTION OF THE PRIOR ART

Alpha alumina monohydrate is commonly produced by processes such as the water hydrolysis of alumina alkoxides, the sodium aluminate process and the alum process. The product alpha alumina monohydrate is typically dried to an $Al_2O_3$ content varying from about 50 to about 86 weight percent. This apparently dry product, which in fact contains free water and water of hydration in addition to $Al_2O_3$, is normally marketed as such for a variety of uses such as catalyst carriers, soil repellents, anti-static agents, anti-friction agents and the like.

In the use of alpha alumina monohydrate as a catalyst carrier, the material is typically marketed as alpha alumina monohydrate containing from about 50 to about 86 weight percent $Al_2O_3$. Such material is readily shaped into catalyst carrier particles by techniques such as extrusion, pelleting, molding or the like. The particles are then dried either before or after impregnation with catalytic materials to form the catalyst product which typically contains the $Al_2O_3$ as gamma alumina which results from heating alpha alumina monohydrate to elevated temperatures for a sufficient period of time. In such applications it is highly desirable that the alpha alumina monohydrate marketed contain minimal quantities of foreign materials such as anionic and cationic constituents.

In the use of alpha alumina monohydrate for soil repellents, anti-static agents, anti-friction agents and the like, it is highly desirable that the alpha alumina monohydrate be dispersed in an aqueous acidic solution. It has long been known that adding acid to the aqueous alumina slurry dried to produce alpha alumina monohydrate results in a product which is dispersible in water to a high degree. Unfortunately, alpha alumina monohydrate is normally marketed by suppliers who produce alpha alumina monohydrate for both uses and the presence of such acidic materials in the alpha alumina monohydrate marketed for catalytic applications is highly undesirable. Thus a problem is presented in that it would be desirable to provide a method whereby a dry alpha alumina monohydrate product may be readily dispersed without the necessity for mixing acidic components with the aqueous slurries dried to produce the alumina and without the necessity for preparing acidic solutions at the point of use. Clearly, an aqueous acidic solution can be used to disperse the alpha alumina monohydrate in water but such is many times undesirable since the end user in many instances does not wish to handle acidic solutions or the like.

Accordingly, a method has long been sought whereby alpha alumina monohydrate may be produced and marketed in a water-only dispersible form without the necessity for modifying the process by which the alpha alumina monohydrate is produced.

It has now been found that this objective is achieved by mixing with the alpha alumina monohydrate containing up to about 86 weight percent $Al_2O_3$ an effective amount of a salt compound selected from the group consisting of salts having the formula MX wherein M is a polyvalent metal cation constituent for which the solubility product $K_{SP}$ of the corresponding metal hydroxide is less than $10^{-20}$ and wherein X is an anion constituent derived from a monovalent acid having an ionization constant $K_A$ greater than $10^{+1}$ and phosphorus dichloride, phosphorus trichloride, phosphorus pentachloride, phosphorus tribromide, phosphorus pentabromide and antimony pentabromide.

The term alpha alumina monohydrate as used herein refers to an apparently dry product which comprises alpha alumina monohydrate ($Al_2O_3 \cdot H_2O$) and in addition may contain free water and the like. The extent to which the alpha alumina monohydrate has been dried is shown hereinafter by reference to the $Al_2O_3$ content of the alpha alumina monohydrate. Typically, the alpha alumina monohydrate offered in the market place contains less than about 86 weight percent $Al_2O_3$ and in most instances contains less than 81 percent $Al_2O_3$. Typical product compositions vary from about 68 to about 75 weight percent $Al_2O_3$.

As the alpha alumina monohydrate is dried to $Al_2O_3$ concentrations approaching 86 weight percent it becomes much less readily extruded, dispersed, or otherwise used in any form other than that in which it exists prior to such drying. As will be noted, a composition corresponding to 86 weight percent $Al_2O_3$ very nearly approximates the theoretical $Al_2O_3$ content of alpha alumina monohydrate. It is well known that when all the free water has been removed from the apparently dry alpha alumina monohydrate dispersion, extrusion etc. becomes extremely difficult and accordingly most alpha alumina monohydrate is marketed within the range set forth above in order that the user may extrude, disperse or otherwise modify the alpha alumina monohydrate to fit his needs.

Even at concentrations as low as about 50 weight percent $Al_2O_3$ the alpha alumina monohydrate, which appears to be a dry solid material, is not readily dispersible in water. Dispersibility on the order of 25 to 55 weight percent is common and when the alpha alumina monohydrate is dried to the ranges set forth above, i.e., 68 to 75 weight percent $Al_2O_3$, water-only dispersibilities on the order of 5 to 20 percent are not uncommon. As noted previously the use of acidic solutions for dispersing the alpha alumina monohydrate results in a much higher dispersibility, however, the necessity for handling the acids presents a serious disadvantage. Further, higher dispersibility in water only can be achieved by acidifying the aqueous slurry from which the alpha alumina monohydrate is produced. Of course, such an acidification step results in the presence of undesirable anionic constituents in the alpha alumina monohydrate product.

The method of the present invention results in increasing the water dispersibility of alpha alumina monohydrate from values of about 5 to 20 weight percent to values on the order of 85 to 95 weight percent. Such an increase represents a substantial improvement in the water dispersibility of the alpha alumina monohydrate and for all practical purposes can be considered to have rendered the alpha alumina monohydrate completely water dispersible. Such is highly desirable in that the use of the salts described above does not result in the necessity for handling acidic solutions nor does it require that the aqueous aluminum slurry from which the alumina is produced be acidified.

The salts are mixed with the alumina in a quantity varying from about 0.1 to about 50 weight percent based on the weight of the alpha alumina monohydrate. In many instances, it has been found that the use of quantities of the salt varying from about 3 to about 10 weight percent is highly desirable and that additional quantities are unnecessary.

The salt compounds as mentioned above include salts having the general formula MX wherein M is a polyvalent metal cation constituent for which the solubility product $K_{SP}$ of the corresponding metal hydroxide is less than $10^{-20}$ and wherein X is an anion constituent derived from a monovalent acid having an ionization constant $K_A$ greater than $10^{+1}$. Some suitable cations are set forth in the following table.

| Cation | Solubility Product, $K_{SP}$, of Corresponding Metal Hydroxide |
|---|---|
| $Sc^{+3}$ | $10^{-27.0}$ |
| $Y^{+3}$ | $10^{-22.0}$ |
| $Nd^{+3}$ | $10^{-21.0}$ |
| $Sn^{+3}$ | $10^{-22.1}$ |
| $Eu^{+3}$ | $10^{-23.0}$ |
| $Gd^{+3}$ | $10^{-22.7}$ |
| $Er^{+3}$ | $10^{-23.4}$ |
| $Tm^{+3}$ | $10^{-23.5}$ |
| $Yb^{+3}$ | $10^{-23.6}$ |
| $Lu^{+3}$ | $10^{-23.7}$ |
| $Ti^{+3}$ | $10^{-40.0}$ |
| $Zr^{+4}$ | $10^{-57.2}$ |
| $Th^{+3}$ | $10^{-44.4}$ |
| $Cr^{+3}$ | $10^{-30.3}$ |
| $U^{+4}$ | $10^{-45.0}$ |
| $Mn^{+3}$ | $10^{-36.0}$ |
| $Fe^{+3}$ | $10^{-37.2}$ |
| $Co^{+3}$ | $10^{-43.0}$ |
| $Ru^{+3}$ | $10^{-36.0}$ |
| $Pd^{+2}$ | $10^{-31.0}$ |
| $Pt^{+2}$ | $10^{-35.0}$ |
| $Au^{+3}$ | $10^{-45.3}$ |
| $Al^{+3}$ | $10^{-35.4}$ |
| $Ga^{+3}$ | $10^{-35.4}$ |
| $In^{+3}$ | $10^{-36.0}$ |
| $Sn^{+2}$ | $10^{-25.7}$ |
| $Sn^{+4}$ | $10^{-57.0}$ |
| $Bi^{+3}$ | $10^{-39.5}$ |

Some suitable anion constituents, which are derived from monovalent acids having an ionization constant, $K_A$, greater than $10^{+1}$ are as follows:

| Anion | Ionization Constant, $K_A$, of Acid |
|---|---|
| $Cl^-$ | $10^{+7}$ |
| $NO_3^-$ | $10^{+1.35}$ |
| $I^-$ | $10^{+9.5}$ |
| $ClO_3$ | $10^{+2.7}$ |
| $ClO_4^-$ | $10^{+7.3}$ |
| $Br^-$ | $10^{+9.0}$ |
| $MnO_4^-$ | $10^{+2.2}$ |

It has been found that the use of the particular salts described results in a surprising increase in the water-only dispersibility of alpha alumina monohydrate and that the salts which do not meet this criteria are not effective to any substantial extent. For instance, in the examples set forth hereinafter, salts prepared with suitable anion materials, but with cations for which the corresponding metal hydroxides have a $K_{SP}$ value higher than $10^{-20}$, are shown to be relatively ineffective in increasing the water-only dispersibility. It is further pointed out that polyvalent anions while they may have $K_A$ values in a suitable range are not considered effective.

Of the foregoing cations the group consisting of $Sn^{+3}$, $Ti^{+3}$, $Cr^{+3}$, $Mn^{+3}$, $Fe^{+3}$, $Co^{+3}$, $Pd^{+3}$, $Pt^2$, $Au^{+3}$, $Al^{+3}$, $Sn^{+2}$, $Sn^{+4}$, and $Bi^{+3}$ is preferred and of the anions set forth the preferred members are selected from the group consisting of $Cl^-$, $NO_3^-$, $I^-$, and $Br^-$. Of the phosphorus halide salts listed the chloride salts are preferred.

The production of alpha alumina monohydrate by techniques such as the water hydrolysis of aluminum alkoxides, the sodium aluminate process, and the alum process are well-known and need not be discussed further except to point out that particularly desirable results have been obtained by the present method when alpha alumina monohydrate produced by the water hydrolysis of aluminum alkoxides was used.

As indicated above, alpha alumina monohydrate when dried to 86 weight percent $Al_2O_3$ and beyond is not readily dispersed, extruded or the like. Obviously, when alpha alumina monohydrate is dried to $Al_2O_3$ contents greater than about 86 weight percent $Al_2O_3$ it ceases to be completely alpha alumina monohydrate, since a portion of the water of hydration has been removed. Such alumina is not considered to be suitable as a starting material for the practice of the method of the present invention and it is believed that no substantial improvement in the water dispersibility of such materials would be achieved by the use of the present method. As indicated hereinbefore the present method relates to an improvement in the water dispersibility of alpha alumina monohydrate which normally is slightly water dispersible initially. As set forth above there are many uses wherein it is highly desirable that the alpha alumina monohydrate be rendered more water dispersible by a method which does not require acidic solutions, or adjustment of the acidity of the solutions from which the alpha alumina monohydrate is produced.

In some instances, the dispersions of the present invention exhibit thixotropic properties, i.e., the dispersions tend to remain in a fluid state when agitated but tend to coagulate when at rest. As a result dispersions are quite stable over long periods of time. The dispersions vary from nearly translucent when the alumina content is low to nearly opaque when the alumina content is high. The color and clarity of the dispersions are of course modified by some of the salt compounds used in the method of the present invention. Desirably, the salt compound is added to the alumina by dry blending and quite obviously it is desirable that the salt compound be in a finely divided state. Such is readily accomplished by grinding, ball milling, or a multitude of other techniques known to the art for modifying the form of solid materials. Generally it is desirable that the salt compound be of a particulate size varying from about 35 to about 6,000 microns.

Having thus described certain preferred embodiments of the present invention, it is pointed out that these embodiments are illustrative rather than limiting in nature and it is anticipated that many variations and modifications within the scope of the present invention may be considered obvious or desirable by those skilled in the art, upon a review of the foregoing description of preferred embodiments and the following examples.

EXAMPLE 1

A series of experiments were conducted in which alpha alumina monohydrate containing about 73.1 weight percent $Al_2O_3$ (DISPAL[1] Alumina) was dry blended with pre-determined amounts of aluminum chloride in a tumble mixer to obtain a fairly homogeneous mixture.

[1] DISPAL is a registered trademark of the Continental Oil Company, 5 Greenway Plaza, Houston, Texas 77001 for alpha alumina monohydrate which typically has the physical and chemical properties shown above.

The amount of aluminum chloride employed was varied as shown in Table 1. After the blending there were a few small lumps of aluminum chloride in the blend which did not get mixed with the alumina. These were left in the mixture. Ten grams of the mixture were stirred in 90 g of distilled $H_2O$ at 75° F for 10 minutes at a mixer speed of 200 RPM. A representative portion of the aqueous alumina dispersion so produced was charged to a centrifuge and centrifuged at 2850 RPM for 10 minutes. The liquid was decanted and the precipitate was oven dried at 190° F for 18 hours. The precipitate represents the amount of alumina not dispersed in the water prior to centrifuging. The amount of alumina dispersed is determined by deducting the weight of the precipitate from the weight of the mixture initially added. The results expressed as the weight percent alumina dispersed are given in the table below.

TABLE I

| Wt. % $AlCl_3$ Based on Alumina | Wt. % Dispersibility in Water |
|---|---|
| 5.5 | 74.7 |
| 7.0 | 79.5 |
| 10.0 | Rapidly set to thixotropic gel. Not centrifuged. |
| 0 | 5.6 |

DISPAL alpha alumina monohydrate typically has the following properties.

| TYPICAL PHYSICAL PROPERTIES | |
|---|---|
| Crystal Structure [1] | Alpha Alumina Monohydrate (Boehmite) |
| Crystal Structure [2] | Gamma Alumina |
| Surface Area [2] | 185 m²/gm |
| Crystallite Size (X-Ray) | |
| 020 Reflection [1] | 60 Angstroms |
| 021 Reflection [1] | 95 Angstroms |
| 440 Reflection [2] | 49 Angstroms |
| Pore Volume | |
| 0–100 Angstroms [2] | 0.4 cc/gm |
| 0–10,000 Angstroms [2] | 0.45 cc/gm |
| Helium Density, gms/cc | 3.32 gms/cc |
| Loose Bulk Density [1] | 610 gms/liter (38#/ft³) |
| Particle Size Dist. [1] | 86% <45μ 2% <200μ |
| Dispersibility, %(.4% $HNO_3$) | 98.5 |
| [1] Plant Product | |
| [2] After Calcination for 3 Hrs 900° f | |

| TYPICAL CHEMICAL COMPOSITION | |
|---|---|
| | Wt. % |
| $Al_2O_3$ Content | 73.1 |
| Total Ignition Loss | 26.9 |
| Carbon (as primary alcohol, removed during calcination) | 0.30 |
| Silica (as $SiO_3$) | 0.008 |
| Iron (as $Fe_2O_3$) | 0.005 |
| Sodium (as $Na_2O$) | 0.004 |
| Sulfur | .005 |

EXAMPLE 2

The procedure and ingredients of Example 1 were employed in this example except that a second lot of DISPAL, alpha alumina monohydrate was used. Ten grams of the mixture were stirred in 90 g of distilled $H_2O$ at 75° F. for 10 minutes at a mixer speed of 200 RPM. A representative portion of the aqueous alumina dispersion so produced was charged to a centrifuge and centrifuged at 2850 RPM for 10 minutes. The liquid was decanted and the precipitate was oven dried at 190° F for 18 hours. The amount of alumina dispersed is determined by substracting the weight of the precipitate from the weight of the mixture added initially.

The results expressed as the weight percent alumina dispersed are given in Table II.

TABLE II

| Wt. % $AlCl_3$ based on alumina | Wt. % Dispersibility |
|---|---|
| 3.65 | 87.8 |
| 5.50 | 88.8 |

The data above were obtained with materials which hydrolyze in $H_2O$ to give HCl. It was also found that a selected group of metal chlorides which do not hydrolyze to any extent in $H_2O$ can also be used to give stable alumina dispersions. The following examples illustrate the use of some of these materials.

EXAMPLE 3

Crystalline stannous chloride dihydrate ($SnCl_2.2H_2O$) was powdered with a mortar and pestle. A dry blend of 50 weight percent DISPAL, alpha alumina monohydrate and 50 weight percent powdered $SnCl_2.2H_2O$ was prepared in a tumble mixer. This mixture was then blended with additional DISPAL alumina to give a mixture containing 94 weight percent alpha alumina monohydrate and 6 weight percent $SnCl_2.2H_2O$. The mixture was dispersed in $H_2O$ by the procedure of Examples 1 and 2 to result in a dispersion containing 10 weight percent alumina. Centrifuging as in Examples 1 and 2 show that 83 weight percent of the alumina was dispersed.

EXAMPLE 4

Other solid metal chlorides which were found to give good DISPAL alumina dispersions were ferric chloride and chromic chloride. The dispersion efficiency of these materials was tested by dissolving them in $H_2O$ then adding the aqueous solutions to the alumina. The following dispersibility results were obtained using the test method explained in Example 1.

TABLE 3

| Dispersant | Wt. % Based on Alumina | Wt. % Anhydrous material based on Alumina | Wt. % Dispersibility |
|---|---|---|---|
| $FeCl_3.6H_2O$ | 5.0 | 3.0 | 80.0 |
| " | 10.0 | 6.0 | 91.5 |
| " | 30.0 | 18.0 | Rapidly set to thixotropic gel. Not centrifuged. |
| $CrCl_3.6H_2O$ | 10.0 | 5.9 | 75.0 |

Both of the above materials give colored dipersions; however, this may be desirable for some applications.

Examples of materials which do not disperse alumina to any extent are shown below.

TABLE 4

| Material | Wt. % Based on Alumina | Wt. % Dispersibility |
|---|---|---|
| $ZnCl_2$ | 50.0 | 0 |
| $FeCl_2 \cdot H_2O$ | 50.0 | 0 |
| $CuCl_2 \cdot 2H_2O$ | 10.0 | 5.5 |
| $CuCl_2 \cdot 2H_2O$ | 50.0 | gel formed |
| $CoCl_2 \cdot 6H_2O$ | 50.0 | 2.3 |
| $MnCl_2 \cdot 4H_2O$ | 10.0 | <10 |
| LiCl | 10.0 | <10 |
| $NiCl_2$ | 10.0 | <10 |
| NaCl | 50.0 | 0 |

TABLE 5

| Cation | Solubility Product $K_{SP}$ of corresponding metal hydroxide |
|---|---|
| $Zn^{+2}$ | $1.8 \times 10^{-14}$ |
| $Fe^{+2}$ | $1.64 \times 10^{-14}$ |
| $Cu^{+2}$ | $> 1.0 \times 10^{-20}$ |
| $Co^{+2}$ | $1.3 \times 10^{-15}$ |
| $Mn^{+2}$ | $4 \times 10^{-14}$ |
| $Ni^{+2}$ | $> 1.0 \times 10^{-20}$ |
| $Li^{+1}$ | $> 1.0 \times 10^{-20}$ |
| $Na^{+1}$ | $> 1.0 \times 10^{-20}$ |

EXAMPLE 5

Various crystalline salt compounds having the general formula MX wherein M and X as described hereinbefore were powdered and dry blended in a tumble mixer with DISPAL alumina to produce a mixture containing 10 weight percent of the salt compound based on the alumina. The mixtures were then dispersed in water by the procedure described in Example 1. Results of these experiments are recorded below in Table 6.

TABLE 6

| Salt Compound | % of Salt Compound Based on Alumina | % Dispersibility |
|---|---|---|
| $Fe(NO_3)_3 \cdot 9H_2O$ | 10 | 87.7 |
| $Al(NO_3)_3 \cdot 9H_2O$ | 10 | 68.2 |
| $Cr(NO_3)_3 \cdot 9H_2O$ | 10 | 67.4 |
| None | 0 | 5.6 |

Each of the salt compounds listed above in Examples 1 through 5 are salt compounds having the general formula MX wherein M is a polyvalent metal cation constituent for which the solubility product, $K_{SP}$, of the corresponding metal hydroxide is less than $10^{-20}$ and x is an anion constituent derived from a monovalent acid which has an ionization constant, $K_A$, larger than $10^{+1}$.

EXAMPLE 6

DISPAL alumina was mixed with phosphorus pentachloride ($PCl_5$). During the mixing the mixture became quite hot as the $PCl_5$ was added. 3.8 weight percent $PCl_5$ was added. The resulting mixture was 80.6 weight percent dispersible using the test procedure of Example 1.

EXAMPLE 7

An experiment was conducted using aluminum acetate, a salt compound having the general formula MX but wherein the X constituent, acetate, is derived from acetic acid which does not have an ionization constant, $K_A$, larger than $10^{+1}$. Ten weight percent, based on the DISPAL alumina, of aluminum acetate was dry blended with the alumina. There was essentially no increase in the dispersibility of the alumina.

Having thus described the invention, I claim:

1. A method for increasing the water dispersibility of alpha-alumina monohydrate containing up to about 86 weight percent $Al_2O_3$, said method comprising, admixing by dry blending an amount equal to from about 0.1 to about 50 weight percent, based on the weight of the alpha alumina monohydrate, of at least one salt compound selected from the group consisting of salts having the general formula MX, wherein M is a polyvalent metal cation constituent selected from the group consisting of $Sc^{+3}$, $Y^{+3}$, $Nd^{+3}$, $Sn^{+3}$, $Eu^{+3}$, $Gd^{+3}$, $Er^{+3}$, $Tm^{+3}$, $Yb^{+3}$, $Lu^{+3}$, $Ti^{+3}$, $Zr^{+4}$, $Th^{+3}$, $Cr^{+3}$, $U^{+4}$, $Mn^{+3}$, $Fe^{+3}$, $Co^{+3}$, $Ru^{+3}$, $Pd^{+2}$, $Pt^{+2}$, $Au^{+3}$, $Al^{+3}$, $Ga^{+3}$, $In^{+3}$, $Sn^{+2}$, $Sn^{+4}$, $Bi^{+3}$, and wherein X is an anion constituent derived from a monovalent acid and is selected from the group consisting of $Cl^-$, $NO_3^-$, $I^-$, $ClO_3$, $ClO_4^-$, $Br^-$, $MnO_4^-$, and phosphorous dichloride, phosphorus trichloride, phosphorous pentachloride, phosphorus tribromide, phosphorous pentabromide, and antimony pentachloride with said alpha alumina monohydrate.

2. The method of claim 1 wherein said salt compound is admixed in an amount equal to from about 3 to about 10 weight percent based on the weight of said alpha alumina monohydrate.

3. The method of claim 1 wherein said alpha alumina monohydrate is produced by the water hydrolysis of aluminum alkoxides.

4. The method of claim 1 wherein said alpha alumina monohydrate contains up to about 81 weight percent $Al_2O_3$.

5. The method of claim 1 wherein said alpha alumina monohydrate contains up to about 78 weight percent $Al_2O_3$.

6. The method of claim 1 wherein said alpha alumina monohydrate contains from about 68 to about 78 weight percent $Al_2O_3$.

7. The preferred method of claim 1 wherein M is selected from the group consisting of $Sn^{+3}$, $Ti^{+3}$, $Cr^{+3}$, $Mn^{+3}$, $Fe^{+3}$, $Co^{+3}$, $Pd^{+2}$, $Pt^{+2}$, $Au^{+3}$, $Al^{+3}$, $Sn^{+2}$, $Sn^{+4}$, and $Bi^{+3}$.

8. The method of claim 7 wherein X is selected from the group consisting of $Cl^-$, $NO_3^-$, $I^-$, and $Br^-$.

9. The method of claim 1 wherein said salt compound is selected from the group consisting of phosphorus dichloride, phosphorus trichloride, phosphorus pentachloride and antimony pentachloride.

* * * * *

UNITED STATES PATENT OFFICE
CERTIFICATE OF CORRECTION

PATENT NO. : 4,055,509
DATED : October 25, 1977
INVENTOR(S) : Dean R. Weimer

It is certified that error appears in the above-identified patent and that said Letters Patent are hereby corrected as shown below:

Column 1, line 21, "alumina" should be --aluminum--.

Column 1, line 49, after "aqueous" three words left out, should read aqueous --or an aqueous--.

Column 5, line 64, "Silica (as $SiO_3$)" should be --Silica (as $SiO_2$)--.

Column 6, line 65, "dipersions" should be --dispersions--.

Column 8, lines 27, 28 and 29, "phosphorous" should be --phosphorus--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks